Aug. 2, 1932.   H. R. BRAND   1,869,539
FOOD PREPARING MACHINE
Filed June 27, 1929
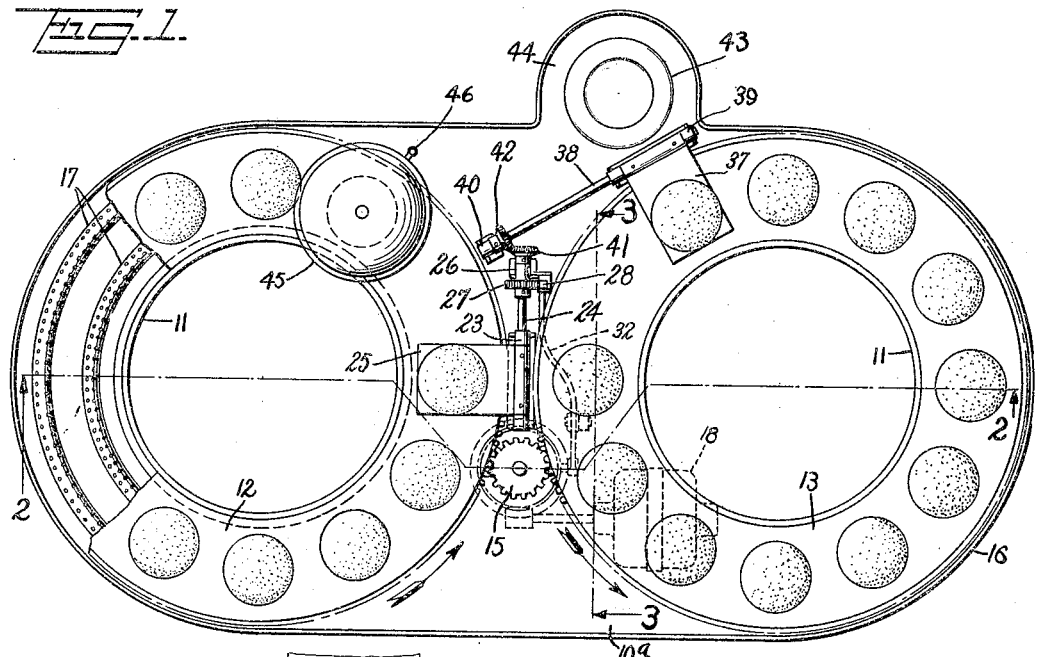
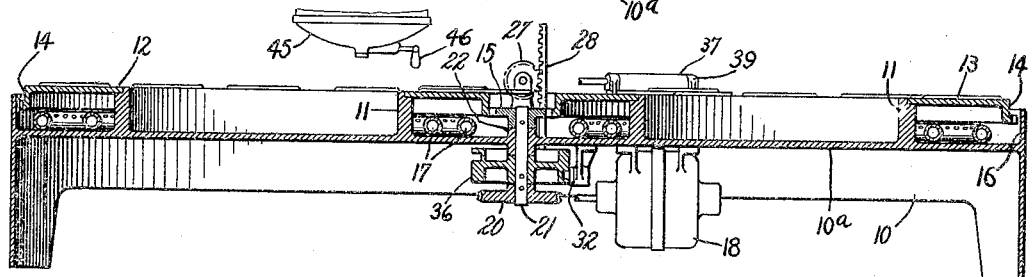
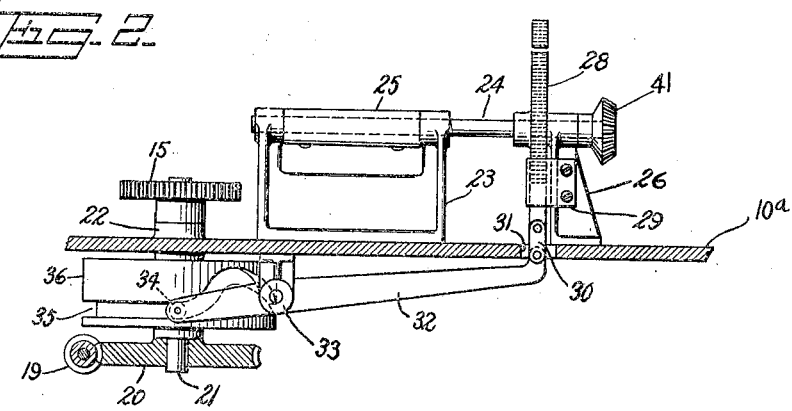
INVENTOR
H. R. Brand
BY
ATTORNEY Patented Aug. 2, 1932

1,869,539

UNITED STATES PATENT OFFICE

HARRY RUSSELL BRAND, OF NEW YORK, N. Y.

FOOD PREPARING MACHINE

Application filed June 27, 1929. Serial No. 373,968.

My invention relates to food preparing apparatus and has for an object to provide an automatic machine for cooking food.

A specific object of the invention is to provide a machine for baking griddle cakes and like foods, which must be baked first on one side and then on the other.

The present invention is a variant of that disclosed in my copending application Serial No. 268,659, filed April 9, 1928. In the particular embodiment described in said copending application a single griddle is employed and the cakes after being baked on one side are automatically turned over and deposited on the same griddle. In the preferred embodiment of my present invention, I employ two adjacent griddles and automatic means for transferring the cakes from one griddle to the other, the cakes being turned over during the transfer so that one griddle cooks one side of the cake and the other griddle the other side of the cake.

Another object of the invention is to provide automatic means for removing and delivering a cake after it has been cooked on both sides Another object of the invention is to turn the cake over as it is being delivered from the machine so that the side first cooked will face downward.

Another object is to provide a pair of rotating griddles and a peel normally engaging the first griddle and located at a fixed point so that the cake as it is carried along by the griddle will ride up on the peel, and also to provide means for intermittently operating the peel to turn the cake over and deposit it on the second griddle.

Another object is to provide a batter reservoir over the first griddle and located at a fixed point with respect to the peel whereby batter deposited from the reservoir will be baked on one side by the time it reaches the peel and be ready for transfer to the second griddle.

Another object is to provide a second peel similar to the first and normally engaging the second griddle at a predetermined point with respect to the first peel, such that the cake delivered to the second griddle will be completely cooked and ready for removal by the time it reaches and rides up on the second peel, and also to provide means for operating the second peel to deliver the finished cake.

Another object is to provide a support on which a plate or the like may be placed to receive the finished cake from the second peel.

Another object is to provide a common driving mechanism for the two peels and for the griddles whereby the two peels will operate simultaneously and in timed relation to the rotation of the griddles.

Other objects of my invention will appear in the following description of a preferred embodiment of my invention and the novelty and scope of the invention will thereafter be pointed out in the claims.

In the accompanying drawing;

Figure 1 is a plan view of my machine partly broken away to reveal interior details;

Fig. 2 is a view in longitudinal section taken substantially on the line 2—2 of Fig. 1, but showing a driving motor in full.

Fig. 3 is an enlarged view in section taken on the line 3—3 of Fig. 1.

The body of my machine is in the form of a table 10, having a table top 10a formed with two annular flanges 11. The latter serve as bearings for a pair of griddles 12 and 13, respectively, and each griddle is formed with a down-turned peripheral flange 14. The flanges 14 are toothed and are engaged by a common driving pinion 15. The pinion being located between the griddles rotates the latter in opposite directions as indicated by the arrows. The table top 10a is provided with a marginal flange 16 which overlaps the toothed flanges 14 and serves as a guard therefor. Supported on the table under each griddle is a heater 17 which, as illustrated, may consist of a pair of gas burner pipes 17. These pipes are connected with a suitable source of fuel supply, not shown.

To drive the griddles I employ an electric motor 18 which is mounted on the under side of the table top and which drives a worm 19. The latter engages a worm wheel 20 keyed upon a vertical shaft 21. The shaft is mounted in a suitable bearing 22 and keyed to its upper end is the pinion 15.

Secured to the table top 10a between the two griddles is a bracket 23, in which is journaled a horizontal shaft 24. Fixed to the shaft 24 is a peel 25 comprising a thin plate which normally rests upon the face of the first griddle 12. An extension of the shaft 24 is supported in a bracket 26 and has keyed thereon a pinion 27. The pinion is engaged by a rack 28 mounted to slide vertically in a suitable guide 29 carried by the bracket 26. The lower end of the rack is connected by a link 30 (which passes through an opening 31 in the table top) to one arm of a lever 32 fulcrumed in a bracket 33 secured to the underside of the table top. The other arm of the lever 32 bears a roller 34 which engages a groove 35 in a cam 36. The cam is mounted on and secured to the shaft 21. The cam groove is of such form that as the griddles are rotated the lever 32 will be periodically oscillated on its fulcrum causing the shaft 24 to be turned intermittently by the rack 28 and pinion 27. As the shaft 24 is turned, the peel 25 will be lifted from engagement with the griddle 12 and turned through an angle of approximately 180 degrees so as to deposit any cake that may rest thereon upon the second griddle 13.

A second peel 37 normally rests upon the griddle 13 and is mounted upon a shaft 38 journaled in a suitable bracket 39. An extension of the shaft 38 is supported in a bracket 40 adjacent the bracket 26. A bevel pinion 41 on the shaft 24 meshes with a bevel pinion 42 on the shaft 38, so that whenever the first peel is operated, the second peel will be simultaneously operated to turn through an angle of 180 degrees. Thus, any cake which may at the moment have ridden upon the griddle 37 will be turned over and deposited upon a plate 43, or other suitable receptacle, supported on an extension 44 of the table top.

Located above the griddle 12 is a reservoir 45 in which batter may be stored. By means of suitable valve mechanism 46, either hand operated as shown in the drawing, or, mechanically operated in timed operation to the operation of the peel 25, portions of the batter may be deposited upon the griddle 12, at such a point with respect to the peel 25 that by the time the griddle has rotated sufficiently to carry the portion of batter to said peel, the batter will be baked on one side and will be ready for transfer by the peel 25 to the adjacent griddle 13. The location of the second peel 37 with respect to the first peel 25 is also so chosen as to insure baking of the cake on the reverse side by the time it reaches the peel 37. When the peel 37 operates to remove the baked cake from the griddle 13 it will be observed that the cake is turned over so that the side last baked will face upward. This is desirable because the side last baked usually presents a smoother and more evenly browned surface.

The operation of the machine will be clear from the description given above, and a summary of operations is deemed unnecessary. It might be explained, however, that when the batter valve is hand operated, the operator will time the operation of the valve 46 to the operation of the peels, opening the valve only at such times as the peel 25 is oscillating toward the griddle 13. The batter deposits will then be properly positioned with respect to said peel.

It will be obvious that the machine could be arranged so that the griddles would turn in opposite directions but in such case the delivery point would be on the opposite side of the machine from that on which the batter reservoir is located. Under most conditions it will be found handier to have the delivery point adjacent the batter depositing point.

While I have described a preferred embodiment of my invention, I consider myself at liberty to make such changes in form, construction, arrangement and operation as fall within the spirit and scope of the following claims.

I claim:

1. In a machine for cooking food, a pair of members each providing a surface for cooking a food portion, a peel normally engaging one of said surfaces, and means for intermittently operating the peel to transfer the food portion from one of the surfaces to the other.

2. In a machine for cooking food, a pair of members each providing a surface for cooking a food portion, a peel normally engaging one of said surfaces, and means for intermittently operating the peel to transfer the food portion from one of the surfaces to the other and for inverting the food portion during such transfer.

3. In a machine for cooking food, a member providing a cooking surface for a food portion, a peel, means for rotating said member, and means alternately holding the peel stationary in contact with the surface to pick up the food therefrom and oscillating the peel away from said member to discharge said food.

4. In a machine for cooking food, a member providing a cooking surface for a food portion, a peel, means for rotating said member, and means alternately holding the peel stationary in contact with the surface to pick up the food therefrom and oscillating the peel away from said member through an angle of more than 90 degrees to discharge and simultaneously invert the food.

5. In a batter-cake baking machine, a griddle, means for depositing a portion of batter thereon, driving mechanism for rotating the griddle, a peel mounted to oscillate in a plane radial to the griddle, and means controlled by the driving mechanism for alternately holding the peel in position to pick up the batter cake from the griddle and oscillating the peel to invert and discharge the batter cake at a predetermined point.

6. In a batter-cake baking machine, a griddle, means for heating the griddle, means for depositing a portion of batter thereon, driving mechanism for rotating the griddle, a peel mounted to oscillate in a plane radial to the griddle, and means controlled by the driving mechanism for alternately moving the peel into position to pick up the batter cake from the griddle and oscillating the peel to invert and discharge the batter cake at a predetermined point.

7. In a batter-cake baking machine, a griddle adapted to bake one side of a batter cake, a second griddle adapted to bake the other side of the cake, a peel adapted to pick up the cake from the first griddle and deposit it face downward on the second griddle, a second peel adapted to pick up the cake from the second griddle and discharge the same at a predetermined point, and a common driving mechanism for the two peels.

8. In a batter-cake baking machine, a griddle adapted to bake one side of a batter cake, a second griddle adapted to bake the other side of the cake, a peel adapted to pick up the cake from the first griddle and deposit it in inverted position on the second griddle, a second peel adapted to pick up the cake from the second griddle and deliver the same at a predetermined point, driving mechanism for rotating the griddles relatively to the peels, and means controlled by said driving mechanism for intermittently operating the peels.

9. In a batter-cake baking machine, a pair of rotary griddles, means for heating the same, means for depositing portions of batter on one of the griddles, a peel mounted at a predetermined position with respect to the batter depositing means and adapted to pick up the batter cakes successively from the first griddle, means for intermittently turning the peel to deposit the cakes successively face-downward upon the second griddle, a second peel adapted to pick up the cakes successively from the second griddle and deposit them at a predetermined delivery point, and means for rotating the griddles in mutually timed relation.

10. In a batter-cake baking machine, a pair of rotary griddles, means for heating the same, means for depositing a portion of batter on the first of the griddles, a support for a plate adjacent the second griddle, a peel mounted at a predetermined position with respect to the batter delivering means and adapted to pick up the batter cake from the first griddle, means for turning the peel to deposit the cake face-downward upon the second griddle, a second peel mounted at a predetermined position with respect to the first peel and adapted to pick up the cake from the second griddle and deposit it upon said plate, and means for rotating the griddles and actuating the peels in mutually timed relation.

11. In a batter-cake baking machine, a pair of rotary griddles, means for heating the same, means for depositing a portion of batter on the first of the griddles, a support for a plate adjacent the second griddle, a peel mounted at a predetermined position with respect to the batter depositing means and adapted to pick up the batter cake from the first griddle, means for turning the peel to deposit the cake face downward upon the second griddle, a second peel mounted at a predetermined position with respect to the first peel and adapted to pick up the cake from the second griddle and deposit it face upward upon said plate, and a common driving means for rotating the griddles and actuating the peels in mutually timed relation.

12. In a batter-cake baking machine, a pair of griddles mounted to rotate, driving mechanism for operating the griddles, a peel adapted to pick up cakes from one griddle, a second peel adapted to pick up cakes from the other griddle, each peel being mounted to oscillate in a plane radial to the griddles whereby the first peel will transfer cakes from the first griddle to the second griddle and the second peel will transfer cakes from the second griddle to the plate, and cam controlled means actuated by said driving mechanism for intermittently oscillating the peels.

13. In a batter-cake baking machine, a pair of griddles mounted to rotate, driving mechanism for rotating the griddles, a reservoir for batter, means for depositing portions of batter from the reservoir upon the first of the griddles, a support for a plate adjacent the second griddle, a peel adapted to pick up cakes from the first griddle, a second peel adapted to pick up cakes from the second griddle, the peels being mounted to oscillate in planes normal to the griddles whereby the first peel will transfer cakes from the first griddle to the second and the second peel will transfer cakes from the second griddle to the plate, and cam controlled means actuated by said driving means for intermittently oscillating the peels in timed relation to the rotation of the griddles.

14. In a batter-cake baking machine, a pair of griddles mounted to rotate, driving mechanism for rotating the griddles, a batter reservoir at one side of the machine and supported over one of the griddles, means for depositing portions of batter from the reservoir upon the griddle thereunder, means for transferring the batter cake from the latter griddle to the other griddle, and means for transferring the cake from said other griddle to a delivery point, said griddles being rotated in opposite directions whereby the finished cakes will be delivered on the same side of the machine as that on which the batter reservoir is located.

15. In a batter-cake baking machine, a pair of annular griddles mounted to rotate, driving mechanism for rotating the griddles, a shaft substantially tangent to the two griddles, a peel secured to the shaft, and means controlled by the driving mechanism for alternately moving the peel into engagement with one of the griddles to pick up food therefrom and oscillating the peel upon said shaft to deposit said food face downward upon the other griddle.

16. In a machine for cooking food, a member providing a cooking surface, a peel, means for moving said member, and means for alternately holding the peel stationary in contact with the surface to pick up the food therefrom and oscillating the peel away from said member to discharge said food.

In testimony whereof, I have signed this specification.

HARRY RUSSELL BRAND.